(12) United States Patent
Bae (10) Patent No.: US 9,617,449 B2
(45) Date of Patent: Apr. 11, 2017

(54) SILOXANE HARD COATING RESIN

(71) Applicant: KOREA ADVANCED INSTITUTE OF SCIENCE AND TECHNOLOGY, Daejeon (KR)

(72) Inventor: Byeong-Soo Bae, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 13/693,143

(22) Filed: Dec. 4, 2012

(65) Prior Publication Data

US 2013/0331476 A1 Dec. 12, 2013

(30) Foreign Application Priority Data

Jun. 12, 2012 (KR) ........................ 10-2012-0062846

(51) Int. Cl.
| | |
|---|---|
| C09D 183/06 | (2006.01) |
| C08J 7/04 | (2006.01) |
| C08G 59/42 | (2006.01) |
| C09D 163/00 | (2006.01) |
| C08G 77/14 | (2006.01) |

(52) U.S. Cl.
CPC ........... *C09D 183/06* (2013.01); *C08G 59/42* (2013.01); *C08J 7/047* (2013.01); *C09D 163/00* (2013.01); *C08G 77/14* (2013.01); *C08J 2483/06* (2013.01); *Y10T 428/31663* (2015.04)

(58) Field of Classification Search
CPC ..... C07F 7/182; C08K 5/5419; C08K 5/1545; C08K 5/1515
USPC ........................................................ 528/27
See application file for complete search history.

(56) References Cited

U.S. PATENT DOCUMENTS

| | | | |
|---|---|---|---|
| 6,090,890 A | 7/2000 | Murakami | |
| 7,202,013 B2* | 4/2007 | Ogihara | ............... C09D 183/04 427/387 |
| 7,329,715 B2 | 2/2008 | Wang | |
| 7,485,690 B2* | 2/2009 | Hamada | ................ G03F 7/0752 528/12 |
| 2009/0269504 A1* | 10/2009 | Liao | ............................... 427/515 |
| 2012/0034450 A1 | 2/2012 | Morita | |
| 2012/0220681 A1* | 8/2012 | Bae | .................... C08G 59/3281 522/31 |

FOREIGN PATENT DOCUMENTS

| | | |
|---|---|---|
| CN | 101068845 | 11/2007 |
| CN | 101213257 | 7/2008 |
| CN | 102419515 | 4/2012 |
| JP | 61-293232 | 12/1986 |
| JP | 2006-063244 | 3/2006 |
| JP | 2007-009080 | 1/2007 |
| JP | 2007-063325 | 3/2007 |
| JP | 2007-217704 | 8/2007 |
| JP | 2011-132416 | 7/2011 |
| KR | 1020110074677 | 7/2011 |
| KR | 10-1147971 | 5/2012 |
| TW | 200619273 | 6/2006 |
| TW | 201118115 | 6/2011 |
| TW | 201132699 | 10/2011 |
| TW | 201211160 | 3/2012 |
| WO | 2011/084250 | 7/2011 |
| WO | 2012/008498 | 1/2012 |

OTHER PUBLICATIONS

KR 10 2011 0074677 Machine translation (2011).*
European Search Report, European Patent Office, EP 13804285.8, Oct. 22, 2015.
Office Action, SIPO, CN application No. 201380031082.X, Nov. 16, 2015.

* cited by examiner

*Primary Examiner* — Kuo-Liang Peng
(74) *Attorney, Agent, or Firm* — Lex IP Meister, PLLC (57) ABSTRACT

The present invention relates to a siloxane hard resin including alicyclic epoxy siloxane alone or a reactive monomer, which is prepared by condensation reaction of alkoxysilanes, and has a weight average molecular weight in the range of 1000 to 4000 and a molecular weight distribution of PDI 1.05 to 1.4. A siloxane hard cured article produced by photo- or thermal polymerization has high hardness by compact crosslinking of siloxane molecules having different molecular weights.

11 Claims, 2 Drawing Sheets

SILOXANE HARD COATING RESIN

CROSS-REFERENCE TO RELATED APPLICATION

This application claims priority from Korean Patent Application No. 10-2012-0062846 filed in the Korean Intellectual Property Office on Jun. 12, 2012, the entire content of which is incorporated herein by reference in its entirety.

BACKGROUND

The present invention relates to a hard coating composition including an alicyclic epoxy group-containing siloxane compound, a method for producing a siloxane hard coated article using the same, and an optical film including the siloxane hard coating cured article.

Transparent plastics have been widely used as a core material in optical and transparent display industries. In particular, transparent plastics such as PC (polycarbonate) or PMMA (polymethyl methacrylate) have been applied in displays, optical lens, transparent boards of large buildings, and automotive industries as a lightweight alternative to glass owing to the properties of high light transmittance, shatter-resistance, and high-refractive index. However, these plastic resins have the disadvantage of low abrasion resistance, because they have lower surface hardness than glass. In order to make up this disadvantage, it is an important issue to develop the hard coating technology for improving the surface hardness of plastics.

Hard coating materials are largely divided into organic, inorganic, and organic-inorganic hybrid materials. Organic materials such as acryl, urethane, and melamine have the advantages of organic materials such as flexibility and moldability, but they have low surface hardness. In contrast, silicon-based inorganic materials have the properties of high surface hardness and transparency, but they have low flexibility and moldability. Since hard coating technology requires the advantages of the both materials, organic-inorganic hybrid materials have attracted more attention than each of them. However, even though many studies have been actively made to integrate the benefits of both organic and inorganic materials into the hard coating technology, they are still unsatisfactory.

Of the conventional technologies, Japanese Patent Publication No. 2006-063244 discloses a resin composition for hard coat, which is composed of colloidal silica surface-treated with a silane coupling agent having a reactive (meth)acrylate group in the molecule, a monomer having one reactive (meth)acrylate group in the molecule or a polymer prepared by polymerization of the monomers, a bifunctional (meth)acrylate, a tri- or higher functional (meth)acrylate, a leveling agent, and a photopolymerization initiator. However, photoradical polymerization of acrylate is sensitive to oxygen, unlike polymerization of alicyclic epoxy group. Thus, when it is intended to obtain a hard coated article using acrylate, there is a disadvantage that inert gas atmosphere should be maintained.

Meanwhile, US Patent Publication No. 20120034450 discloses a surface protection film, which can be obtained by mixing an ionizing radiation curable resin, a matting agent, an ultraviolet ray absorbing agent, and inorganic fine particles subjected to hydrophobization treatment so as to prepare a resin, and then curing the resin. However, physical mixing of the ionizing radiation curable resin with the inorganic fine particles may decrease dispersibility and cause aggregation of inorganic fine particles. Transmittance is also decreased due to light scattering at the interface between the resin and the inorganic fine particles. Therefore, it is not suitable for optical protection films.

Accordingly, it is expected that development of hard coating materials with easy processability of organic materials and high light transmittance and surface hardness of inorganic materials will be essential for a wide range of applications of plastics.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention is intended to provide a hard coating composition having easy processability and high surface hardness suitable for a hard coating agent, in which a siloxane molecule having the properties of inorganic materials is made to chemically bind with an alicyclic epoxy group having the properties of organic materials, and the siloxane molecule is made to have a wide molecular weight distribution for compact crosslinking during polymerization of the alicyclic epoxy group in order to obtain high surface hardness due to the inorganic material, unlike in the conventional technique of physically mixing silica particles in an organic resin.

Further, the present invention provides a method for producing a siloxane hard coating cured article by photopolymerization or thermal polymerization of the hard coating composition.

Still another object of the present invention is to provide an optical film including the siloxane hard coating cured article obtained by photopolymerization or thermal polymerization of the hard coating composition.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements.

The present invention relates to a hard coating composition including a siloxane resin having an alicyclic epoxy group.

The siloxane resin having an alicyclic epoxy group has a weight average molecular weight in the range of 1000 to 4000 and a molecular weight distribution of PDI 1.05 to 1.4 through condensation reaction of alkoxysilane having an alicyclic epoxy group alone or between alkoxysilane having an alicyclic epoxy group and heterogeneous alkoxysilane. There is an advantage that the siloxane molecules having different molecular weights mixed in the siloxane resin according to the present invention make it possible to cause compact crosslinking between the siloxane molecules during photopolymerization or thermal polymerization of the alicyclic epoxy group.

Further, owing to the properties of the alicyclic epoxy group, the siloxane resin having the alicyclic epoxy group of the present invention exhibits no oxygen sensitivity upon polymerization and is photocurable or thermal curable depending on a polymerization initiator, and thus it shows good processability.

Viscosity, curing rate and density of the siloxane hard resin can be controlled by adding a reactive monomer which reacts with the alicyclic epoxy group to form crosslinking, for example, acid anhydride or oxetane, to the siloxane resin having the alicyclic epoxy group synthesized by condensation reaction, thereby providing a siloxane hard resin composition optimal for the use of the hard coated article.

Therefore, the siloxane hard resin of the present invention has easy processability of the alicyclic epoxy group and high surface hardness and transparency through compact crosslinking of the siloxane network due to the siloxane molecules having different molecular weights.

Hereinafter, the present invention will be described in detail.

The siloxane resin according to the present invention is prepared by hydrolysis and condensation reaction of alkoxysilane having the alicyclic epoxy group alone or between alkoxysilane having the alicyclic epoxy group and heterogeneous alkoxysilane in the presence of water.

Hydrolysis and condensation reaction of alkoxysilanes in the presence of water are schematically shown in the following [Reaction Scheme 1], [Reaction Scheme 2] and [Reaction Scheme 3].

[Reaction Scheme 1]

[Reaction Scheme 2]

[Reaction Scheme 3]

wherein R is a straight or branched $C_1$ to $C_7$ alkyl group, R' may include one or more functional groups selected from the group consisting of a straight or branched $C_1$ to $C_6$ alkyl group containing an alicyclic epoxy group, a ($C_1$ to $C_{20}$) alkyl group, a ($C_3$ to $C_8$) cycloalkyl group, a ($C_2$ to $C_{20}$) alkenyl group, a ($C_2$ to $C_{20}$) alkynyl group, a ($C_6$ to $C_{20}$) aryl group, an acryl group, a methacryl group, a halogen group, an amino group, a mercapto group, an ether group, an ester group, a carbonyl group, a carboxyl group, a vinyl group, a nitro group, a sulfone group, an alkyd group, etc.

[Reaction Scheme 1] shows formation of a hydroxyl group resulting from hydrolysis of the alkoxy group of the starting material alkoxysilane by water. The hydroxyl group thus formed forms a siloxane bond through condensation reaction with the hydroxyl group or alkoxy group of another silane, as shown in [Reaction Scheme 2] or [Reaction Scheme 3].

When the alicyclic epoxy siloxane hard resin having a weight average molecular weight in the range of 1000 to 4000 and a molecular weight distribution of PDI 1.05 to 1.4 is prepared by the above Reaction Schemes, a catalyst is preferably used in order to increase the reaction rate. The useful catalyst may include acidic catalysts such as hydrochloric acid, acetic acid, hydrogen fluoride, nitric acid, sulfuric acid, chlorosulfonic acid, iodic acid, pyrophosphoric acid or the like, basic catalysts such as ammonia, potassium hydroxide, sodium hydroxide, barium hydroxide, imidazole or the like, and ion exchange resins such as Amberite IRA-400, IRA-67 or the like, and may be also selected from the group consisting of combinations thereof. The amount of the catalyst is not particularly limited, but the acidic or basic catalyst is preferably added in an amount of 0.0001 to 0.01 parts by weight, based on 100 parts by weight of alkoxysilane, and the ion exchange resin is preferably added in an amount of 1 to 10 parts by weight, based on 100 parts by weight of alkoxysilane.

The hydrolysis and condensation reaction may be performed at room temperature for 12 hours to 7 days under stirring, but preferably performed at 60 to 100° C. for 2 hours to 72 hours under stirring in order to facilitate the reaction.

As shown in [Reaction Scheme 1], [Reaction Scheme 2], and [Reaction Scheme 3], when the reactions occur, alcohol and water are generated as byproducts. The removal of alcohol and water is performed to reduce the reverse reaction and induce the forward reaction, thereby controlling the reaction rate. In addition, when the reactions are terminated, alcohol and water remaining in the siloxane resin can be removed under reduced pressure at 60 to 100° C. for 10 to 60 minutes.

The alkoxysilane having the alicyclic epoxy group for the preparation of the alicyclic epoxy siloxane hard resin may be one or more selected from alkoxysilanes having an alicyclic epoxy group and an alkoxy group, which are represented by the following Chemical Formula 1.

$$R^1{}_n Si(OR^2)_{4-n}$$ [Chemical Formula 1]

wherein $R^1$ is a straight or branched $C_1$ to $C_6$ alkyl group containing an alicyclic epoxy group, the alicyclic epoxy group is a $C_3$ to $C_6$ cycloalkyl group having an epoxy group, $R^2$ is a straight or branched $C_1$ to $C_7$ alkyl group, and n is an integer of 1 to 3.

Examples of the alkoxysilane having Chemical Formula 1 may include 2-(3,4-epoxycyclohexyl)ethyltrimethoxysilane, 2-(3,4-epoxycyclohexyl)ethyltriethoxysilane or the like, and one or more selected from the group consisting of combinations thereof may be used, but are not limited thereto.

Further, the alicyclic epoxy siloxane hard resin may be prepared by using alkoxysilane having the alicyclic epoxy group alone, but may be also prepared through hydrolysis and condensation reaction between alkoxysilane having the alicyclic epoxy group and heterogeneous alkoxysilane. The heterogeneous alkoxysilane may be one or more selected from alkoxysilanes represented by the following Chemical Formula 2.

[Chemical Formula 2]

wherein $R^3$ may include one or more functional groups selected from the group consisting of a ($C_1$ to $C_{20}$) alkyl group, a ($C_3$ to $C_8$) cycloalkyl group, a ($C_2$ to $C_{20}$) alkenyl group, a ($C_2$ to $C_{20}$) alkynyl group, a ($C_6$ to $C_{20}$) aryl group, an acryl group, a methacryl group, a halogen group, an amino group, a mercapto group, an ether group, an ester group, a carbonyl group, a carboxyl group, a vinyl group, a nitro group, a sulfone group, an alkyd group or the like. $R^4$ is a straight or branched alkyl ($C_1$ to $C_7$), and m is an integer of 0 to 3.

For example, one or more selected from the group consisting of tetramethoxysilane, tetraethoxysilane, methyltrimethoxysilane, methyltriethoxysilane, methyltripropoxysilane, dimethyldimethoxysilane, dimethyldiethoxysilane, phenyltrimethoxysilane, phenyltriethoxysilane, diphenyldimethoxysilane, diphenyldiethoxysilane, triphenylmethoxysilane, triphenylethoxysilane, ethyltriethoxysilane, propyltrimethoxysilane, vinyltrimethoxysilane, vinyltriethoxysilane, vinyltripropoxysilane, N-(3-acryloxy-2-hydroxypropyl)-3-aminopropyltrimethoxysilane, N-(3-acryloxy-2-hydroxypropyl)-3-aminopropyltriethoxysilane, N-(3-acryloxy-2-hydroxypropyl)-3-aminopropyltripropoxysilane, 3-acryloxypropylmethylbis(trimethoxy)silane, 3-acryloxypropyltrimethoxysilane, 3-acryloxypropyltriethoxysilane, 3-acryloxypropyltripropoxysilane, 3-(meth)acryloxypropyltrimethoxysilane, 3-(meth)acryloxypropyltriethoxysilane, 3-(meth)acryloxypropyltripropoxysilane, N-(aminoethyl)-3-aminopropyltrimethoxysilane, N-(2-aminoethyl)-3-aminopropyltriethoxysilane, 3-aminopropyltrimethoxysilane, 3-aminopropyltriethoxysilane, chloropropyltrimethoxysilane, chloropropyltriethoxysilane, heptadecafluorodecyltrimethoxysilane or the like may be used, but are not limited thereto.

To provide easy processability by controlling the viscosity of the alicyclic epoxy siloxane hard resin, a reactive monomer capable of forming crosslinking by photopolymerization or thermal polymerization with the alicyclic epoxy group may be added. The addition amount of the reactive monomer is not particularly limited, but the reactive monomer is preferably added in an amount of 1 to 100 parts by weight, based on 100 parts by weight of the alicyclic epoxy siloxane hard resin. The reactive monomer includes a cyclic ether group such as an oxetane group, a vinyl ether group, an alicyclic epoxy group such as a $C_3$ to $C_6$ cycloalkyl group having an epoxy group, an acid anhydride group or the like, but is not limited thereto.

The acid anhydride monomer may include at least one acid anhydride of the following Chemical Formula 3.

[Chemical Formula 3]

Specifically, the acid anhydride monomer may be one or more selected from the group consisting of phthalic anhydride, tetrahydrophthalic anhydride, hexahydrophthalic anhydride, nadic methyl anhydride, chlorendic anhydride, and pyromellitic anhydride, but is not limited thereto. The oxetane monomer may include at least one oxetane group of the following Chemical Formula 4.

[Chemical Formula 4]

Specifically, the oxetane monomer may be one or more selected from the group consisting of 3-ethyl-3-hydroxymethyloxetane, 2-ethylhexyloxetane, xylene bis oxetane, and 3-ethyl-3 [[[3-ethyloxetan-3-yl]methoxy]methyl]oxetane, but is not limited thereto.

The reactive monomer having the alicyclic epoxy group containing an epoxy group as $C_6$ cycloalkyl group may be one or more selected from the group consisting of 4-vinylcyclohexene dioxide, cyclohexene vinyl monooxide, (3,4-epoxycyclohexyl)methyl 3,4-epoxycyclohexylcarboxylate, 3,4-epoxycyclohexylmethyl methacrylate, and bis(3,4-epoxycyclohexylmethyl) adipate, but is not limited thereto.

A photopolymerization initiator such as an onium salt, an organometallic salt or the like, and a thermal polymerization initiator such as amine, imidazole, onium salt or the like may be used as an initiator for the polymerization of the alicyclic epoxy siloxane hard resin. The addition amount of the polymerization initiator is not particularly limited, but it is preferably added in an amount of 0.1 to 10 parts by weight, based on 100 parts by weight of the siloxane resin having the alicyclic epoxy group.

For example, the photopolymerization initiator may be one or more selected from the group consisting of an aryl sulfonium hexafluoroantimonate salt, an aryl sulfonium hexafluorophosphate salt, a diphenyliodonium hexafluorophosphate salt, a diphenyliodonium hexafluoroantimonate salt, a ditolyliodonium hexafluorophosphate salt, a 9-(4-hydroxyethoxyphenyl)thianthrenium hexafluorophosphate salt or the like, but is not limited thereto.

Further, the thermal polymerization initiator may be one or more selected from the group consisting of a 3-methyl-2butenyltetramethylenesulfonium hexafluoroantimonate salt, an ytterbium trifluoromethanesulfonate salt, a samarium trifluoromethanesulfonate salt, an erbium trifluoromethanesulfonate salt, a dysprosium trifluoromethanesulfonate salt, a lanthanum trifluoromethanesulfonate salt, a tetrabutylphosphonium methanesulfonate salt, an ethyltriphenylphosphonium bromide salt, benzyldimethylamine, dimethylaminomethylphenol, triethanolamine, N-n-butylimidazole, 2-ethyl-4-methylimidazole or the like, but is not limited thereto.

An organic solvent may be added in order to provide easy processability by controlling the viscosity of the alicyclic epoxy siloxane hard resin and to control the thickness of a coating film at the same time. The addition amount of the organic solvent is not particularly limited, but alcohol is preferably added in an amount of 0.1 to 10 parts by weight, based on 100 parts by weight of the alicyclic epoxy siloxane hard resin.

The useful organic solvent may be one or more selected from the group consisting of ketones such as acetone, methylethylketone, methylbutylketone, methylisobutylketone, cyclohexanone or the like, cellosolves such as methyl cellosolve, ethyl cellosolve, cellosolve acetate, butyl cellosolve or the like, ethers such as ethyl ether, dioxane, tetrahydrobutane or the like, esters such as methyl acetate, ethyl acetate, propyl acetate, isopropyl acetate, butyl acetate, isobutyl acetate, pentyl acetate, isopentyl acetate or the like, alcohols such as butanol, 2-butanol, isobutyl alcohol, isopropyl alcohol or the like, halogenated hydrocarbons such as dichloromethane, chloroform, dichloroethane, trichloroethane, tetrachloroethane, dichloroethylene, trichloroethylene, tetrachloroethylene, chlorobenzene, ortho-dichlorobenzene or the like, hydrocarbons such as n-hexane, cyclohexanol, methylcyclohexanol, benzene, toluene, xylene or the like, but is not limited thereto.

The alicyclic epoxy siloxane hard resin may include an antioxidant in order to prevent oxidation reaction due to the polymerization. The antioxidant may be a mixture of one or more selected from the group consisting of phenolic antioxidants, phosphite antioxidants, aminic antioxidants, thioester antioxidants or the like, but is not limited thereto. For example, the phenolic antioxidant may be selected from the group consisting of tetrakis[methylene-3-(3,5-di-tert-butyl-4-hydroxyphenyl)propionate]methane, 1,2-bis(3,5-di-tert-butyl-4-hydroxyhydrocinnamoyl)hydrazine, thiodiethylene bis[3-(3,5-di-tert-butyl-4-hydroxyphenyl)propionate], octadecyl-3-(3,5-di-tert-butyl-4-hydroxyphenyl)propionate, isotridecyl-3-(3,5-di-tert-butyl-4-hydroxyphenyl)propionate, N,N'-hexamethylenebis(3,5-di-tert-butyl-4-hydroxyhydrocinnamamide), benzenepropanoic acid, 3,5-bis(1,1-dimethylethyl)-4-hydroxy-2,2'-ethylidenebis(4,6-di-tert-butylphenol) 1,3,5-trimethyl-2,4,6-tris(3,5-di-tert-butyl-4-hydroxybenzyl)benzene, 4,6-bis(octylthiomethyl)-o-cresol, 1,3,5-tris(2,6-dimethyl-3-hydroxy-4-tert-butylbenzyl)isocyanurate, 2,2'-methylenebis(4-methyl-6-tert-butylphenol), triethylene glycol-bis-3-(3-tert-butyl-4-hydroxy-5-methylphenyl)propionate, 2,5-di-tert-amyl-hydroquinone, hexamethylenebis[3-(3,5-di-tert-butyl-4-hydroxyphenyl)propionate], tris-(3,5-di-tert-butylhydroxybenzyl) isocyanurate, 4,4'-thiobis(6-tert-butyl-m-cresol), 4,4'-butylidenebis(6-tert-butyl-3-methylphenol) and combinations thereof, the phosphite antioxidant may be selected from the group consisting of tris(2,4-di-tert-butylphenyl) phosphite, distearyl pentaerythritol diphosphite, bis(2,4-di-tert-butylphenyl) pentaerythritol diphosphite, triphenyl phosphite, triisodecyl phosphite, diphenylisodecyl phosphite, 2-ethylhexyl diphenyl phosphite, poly(dipropylene glycol) phenyl phosphite, tris(nonylphenyl) phosphite and combinations thereof, the aminic antioxidant may be 2,2,4-trimethyl-1,2-dihydroquinoline oligomer, the thioester antioxidant may be selected from the group consisting of pentaerythritol tetrakis(3-laurylthiopropionate) distearyl thiodipropionate, dilauryl thiodipropionate, ditridecyl thiodipropionate and combinations thereof, but are not limited thereto. The addition amount of the antioxidant is not particularly limited, but it is preferably added in an amount of 0.1 to 10 parts by weight, based on 100 parts by weight of the alicyclic epoxy siloxane hard resin.

After coating, casting, and molding steps of the alicyclic epoxy siloxane hard resin composition, photopolymerization or thermal polymerization may be performed to produce a siloxane hard cured article having high surface hardness. In the photopolymerization, post-irradiation thermal treatment may be performed to obtain homogeneous curing density, and the treatment may be performed at a temperature from 50° C. or higher to 250° C. or lower, but is not limited thereto. Further, the thermal polymerization may be performed at a temperature from 50° C. or higher to 250° C. or lower, but is not limited thereto. It may vary depending on process conditions of the siloxane hard cured article. If the thermal treatment temperature is higher than 250° C., chains between organic functional groups can be broken. If the thermal treatment temperature is a low temperature lower than 50° C., the polymerization may not occur properly.

As described above, the present invention provides a hard coating composition having easy processability and high surface hardness suitable for a hard coating agent, in which the siloxane molecules having the properties of inorganic materials are made to chemically bind with an alicyclic epoxy group having the properties of organic materials, and the siloxane molecules are made to have a wide molecular weight distribution for compact crosslinking during polymerization of the alicyclic epoxy group in order to obtain high surface hardness due to the inorganic material.

Hereinafter, the actions and the effects of the present invention will be explained in more detail via specific examples of the invention. However, these examples are merely illustrative of the present invention and the scope of the invention should not be construed to be defined thereby.

EXAMPLE 1

Figure 1:
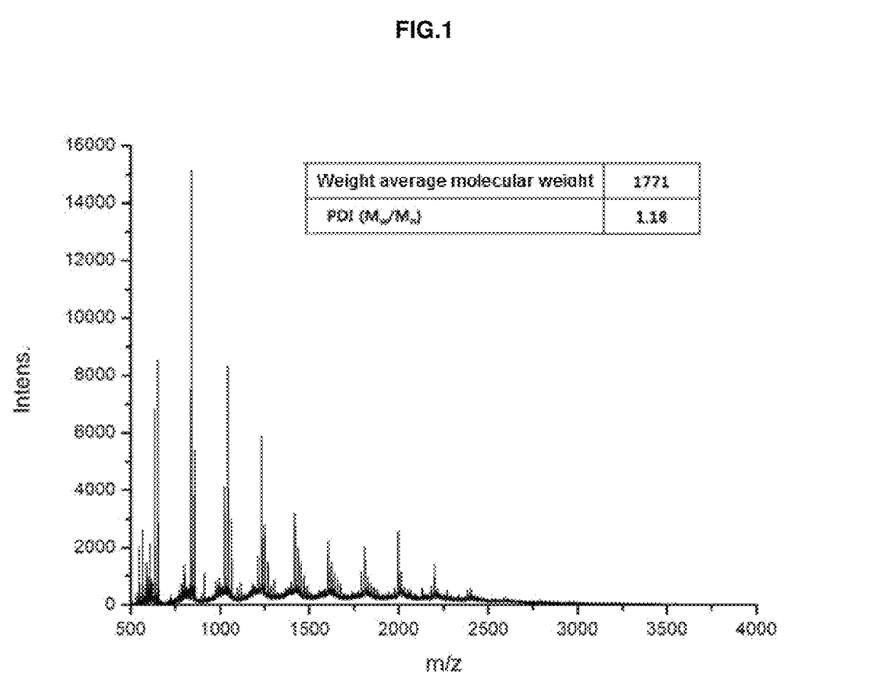
FIG. 1 is a graph which is obtained by measuring molecular weights of siloxane hard resins having an alicyclic epoxy group according to Examples 1, 2, and 3 of the present invention using a Matrix-Assisted Laser Desorption Ionization Mass Spectrometer.

Photopolymerization 2-(3,4-epoxycyclohexyl)ethyltrimethoxysilane (ECTMS, Gelest) and water ($H_2O$, Sigma-Aldrich) were mixed at a ratio of 24.64 g:2.70 g (0.1 mol:0.15 mol), and then put into a 100 ml 2-neck flask. Thereafter, 0.05 ml of ammonia as a catalyst was added to the mixture, and stirred at 60° C. for 6 hours. The mixture was filtered using 0.45 μm Teflon filter, thereby obtaining an alicyclic epoxy siloxane hard resin. The molecular weight of the alicyclic epoxy siloxane hard resin was measured using a Matrix-Assisted Laser Desorption Ionization Mass Spectrometer, and shown in the following FIG. 1. By using this measured value, it was confirmed that the alicyclic epoxy siloxane hard resin has a number average molecular weight of 1498, a weight average molecular weight of 1771, and PDI ($M_w/M_n$) of 1.18.

Next, an aryl sulfonium hexafluoroantimonate salt as a polymerization initiator for photopolymerization was added in an amount of 2 parts by weight, based on the resultant resin. Then, 1.35 parts by weight of iso-octyl-3-(3,5-di-tert-butyl-4-hydroxyphenyl)propionate and 3.6 parts by weight of tris(nonylphenyl)phosphite were added as antioxidants to prevent oxidation due to the polymerization, based on the resultant resin.

The siloxane hard resin composition was applied onto the surface of PET to have different thickness of 20, 40, and 60 μm, and then exposed to a UV lamp at 365 nm wavelength for 1 minute for photo-curing. After photo-curing was completely finished, thermal treatment was performed at a temperature of 80° C. for 1 hour so as to produce a siloxane hard cured article.

EXAMPLE 2

Photopolymerization 2-(3,4-epoxycyclohexyl)ethyltrimethoxysilane (ECTMS, Gelest) and water ($H_2O$, Sigma-Aldrich) were mixed at a ratio of 24.64 g:2.70 g (0.1 mol:0.15 mol), and then put into a 100 ml 2-neck flask. Thereafter, 0.05 ml of ammonia as a catalyst was added to the mixture, and stirred at 60° C. for 6 hours. The mixture was filtered using 0.45 μm Teflon filter, thereby obtaining an alicyclic epoxy siloxane hard resin. The molecular weight of the alicyclic epoxy siloxane hard resin was measured using a Matrix-Assisted Laser Desorption Ionization Mass Spectrometer, and shown in the following FIG. 1. By using this measured value, it was confirmed that the alicyclic epoxy siloxane hard resin has a number average molecular weight of 1498, a weight average molecular weight of 1771, and PDI ($M_w/M_n$) of 1.18.

Next, 3-ethyl-3 [[[3-ethyloxetan-3-yl]methoxy]methyl] oxetane as a photopolymerizable monomer was added in an amount of 20 parts by weight, based on the resultant resin, and an aryl sulfonium hexafluoroantimonate salt as a polymerization initiator for photopolymerization was added in an amount of 2 parts by weight, based on the mixed resin. Then, 1.35 parts by weight of iso-octyl-3-(3,5-di-tert-butyl-4-hydroxyphenyl)propionate and 3.6 parts by weight of tris(nonylphenyl) phosphite were added as antioxidants to prevent oxidation due to the polymerization, based on the resultant resin.

The siloxane hard resin composition was applied onto the surface of PET to have different thickness of 20, 40, and 60 μm, and then exposed to a UV lamp at 365 nm wavelength for 1 minute for photo-curing. After photo-curing was completely finished, thermal treatment was performed at a temperature of 80° C. for 1 hour so as to produce a siloxane hard cured article.

EXAMPLE 3

Thermal Polymerization 2-(3,4-epoxycyclohexyl)ethyltrimethoxysilane (ECTMS, Gelest) and water ($H_2O$, Sigma-Aldrich) were mixed at a ratio of 24.64 g:2.70 g (0.1 mol:0.15 mol), and then put into a 100 ml 2-neck flask. Thereafter, 0.05 ml of ammonia as a catalyst was added to the mixture, and stirred at 60° C. for 6 hours. The mixture was filtered using 0.45 μm Teflon filter, thereby obtaining an alicyclic epoxy siloxane hard resin. The molecular weight of the alicyclic epoxy siloxane hard resin was measured using a Matrix-Assisted Laser Desorption Ionization Mass Spectrometer, and shown in the following FIG. 1. By using this measured value, it was confirmed that the alicyclic epoxy siloxane hard resin has a number average molecular weight of 1498, a weight average molecular weight of 1771, and PDI ($M_w/M_n$) of 1.18.

Next, 4-methyl-1,2-cyclohexene dicarboxylic anhydride as a thermal polymerizable monomer was added in an amount of 90 parts by weight, based on the resultant resin, and 2-ethyl-4-methylimidazole as a polymerization initiator for thermal polymerization was added in an amount of 2 parts by weight, based on the mixed resin. Then, 1.35 parts by weight of iso-octyl-3-(3,5-di-tert-butyl-4-hydroxyphenyl)propionate and 3.6 parts by weight of tris(nonylphenyl) phosphite were added as antioxidants to prevent oxidation due to the polymerization, based on the resultant resin.

The siloxane hard resin composition was applied onto the surface of PET to have different thickness of 20, 40, and 60 μm, and thermal treatment was performed at a temperature of 80° C. for 3 hours so as to produce a siloxane hard cured article.

EXAMPLE 4

Figure 2:
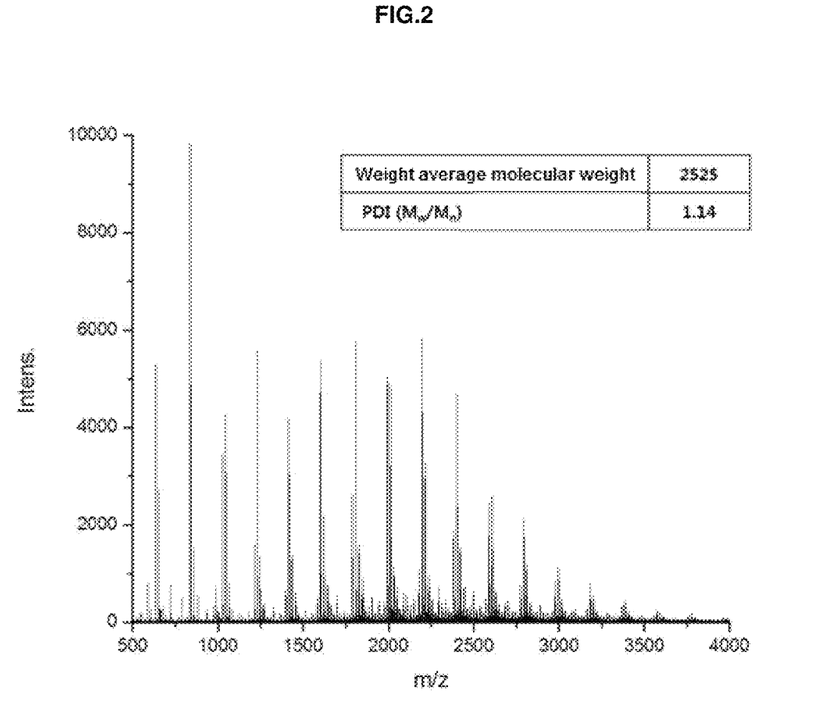
FIG. 2 is a graph which is obtained by measuring molecular weights of siloxane resins having an alicyclic epoxy group according to Examples 3, 4, and 5 of the present invention using a Matrix-Assisted Laser Desorption Ionization Mass Spectrometer.

Photopolymerization 2-(3,4-epoxycyclohexyl)ethyltrimethoxysilane (ECTMS, Gelest) and water ($H_2O$, Sigma-Aldrich) were mixed at a ratio of 24.64 g:2.70 g (0.1 mol:0.15 mol), and then put into a 100 ml 2-neck flask. Thereafter, 6.1 g of Amberite IRA-400 as a catalyst was added to the mixture, and stirred at 60° C. for 24 hours. The mixture was filtered using 0.45 μm Teflon filter, thereby obtaining an alicyclic epoxy siloxane hard resin. The molecular weight of the alicyclic epoxy siloxane hard resin was measured using a Matrix-Assisted Laser Desorption Ionization Mass Spectrometer, and shown in the following FIG. 2. By using this measured value, it was confirmed that the alicyclic epoxy siloxane hard resin has a number average molecular weight of 2217, a weight average molecular weight of 2525, and PDI ($M_w/M_n$) of 1.14.

Next, an aryl sulfonium hexafluoroantimonate salt as a polymerization initiator for photopolymerization was added in an amount of 2 parts by weight, based on the mixed resin. Then, 1.35 parts by weight of iso-octyl-3-(3,5-di-tert-butyl-4-hydroxyphenyl)propionate and 3.6 parts by weight of tris(nonylphenyl)phosphite were added as antioxidants to prevent oxidation due to the polymerization, based on the resultant resin.

The siloxane hard resin composition was applied onto the surface of PET to have different thickness of 20, 40, and 60 μm, and then exposed to a UV lamp at 365 nm wavelength for 1 minute for photo-curing. After photo-curing was completely finished, thermal treatment was performed at a temperature of 80° C. for 1 hour so as to produce a siloxane hard cured article.

EXAMPLE 5

Photopolymerization 2-(3,4-epoxycyclohexyl)ethyltrimethoxysilane (ECTMS, Gelest) and water ($H_2O$, Sigma-Aldrich) were mixed at a ratio of 24.64 g:2.70 g (0.1 mol:0.15 mol), and then put into a 100 ml 2-neck flask. Thereafter, 6.1 g of Amberite IRA-400 as a catalyst was added to the mixture, and stirred at 60° C. for 24 hours. The mixture was filtered using 0.45 μm Teflon filter, thereby obtaining an alicyclic epoxy siloxane hard resin. The molecular weight of the alicyclic epoxy siloxane hard resin was measured using a Matrix-Assisted Laser Desorption Ionization Mass Spectrometer, and shown in the following FIG. 2. By using this measured value, it was confirmed that the alicyclic epoxy siloxane hard resin has a number average molecular weight of 2217, a weight average molecular weight of 2525, and PDI ($M_w/M_n$) of 1.14.

Next, 3-ethyl-3 [[[3-ethyloxetan-3-yl]methoxy]methyl] oxetane as a photopolymerizable monomer was added in an amount of 20 parts by weight, based on the resultant resin, and an aryl sulfonium hexafluoroantimonate salt as a polymerization initiator for photopolymerization was added in an amount of 2 parts by weight, based on the mixed resin. Then, 1.35 parts by weight of iso-octyl-3-(3,5-di-tert-butyl-4-hydroxyphenyl)propionate and 3.6 parts by weight of tris(nonylphenyl) phosphite were added as antioxidants to prevent oxidation due to the polymerization, based on the resultant resin.

The siloxane hard resin composition was applied onto the surface of PET to have different thickness of 20, 40, and 60 μm, and then exposed to a UV lamp at 365 nm wavelength for 1 minute for photo-curing. After photo-curing was completely finished, thermal treatment was performed at a temperature of 80° C. for 1 hour so as to produce a siloxane hard cured article.

EXAMPLE 6

Thermal Polymerization 2-(3,4-epoxycyclohexyl)ethyltrimethoxysilane (ECTMS, Gelest) and water (H$_2$O, Sigma-Aldrich) were mixed at a ratio of 24.64 g:2.70 g (0.1 mol:0.15 mol), and then put into a 100 ml 2-neck flask. Thereafter, 6.1 g of Amberite IRA-400 as a catalyst was added to the mixture, and stirred at 60° C. for 24 hours. The mixture was filtered using 0.45 μm Teflon filter, thereby obtaining an alicyclic epoxy siloxane hard resin. The molecular weight of the alicyclic epoxy siloxane hard resin was measured using a Matrix-Assisted Laser Desorption Ionization Mass Spectrometer, and shown in the following FIG. 2. By using this measured value, it was confirmed that the alicyclic epoxy siloxane hard resin has a number average molecular weight of 2217, a weight average molecular weight of 2525, and PDI ($M_w/M_n$) of 1.14.

Next, 4-methyl-1,2-cyclohexenedicarboxylic anhydride as a thermal polymerizable monomer was added in an amount of 90 parts by weight, based on the resultant resin, and 2-ethyl-4-methylimidazole as a polymerization initiator for thermal polymerization was added in an amount of 2 parts by weight, based on the mixed resin. Then, 1.35 parts by weight of iso-octyl-3-(3,5-di-tert-butyl-4-hydroxyphenyl)propionate and 3.6 parts by weight of tris(nonylphenyl) phosphite were added as antioxidants to prevent oxidation due to the polymerization, based on the resultant resin.

The siloxane hard resin composition was applied onto the surface of PET to have different thickness of 20, 40, and 60 μm, and then thermal treatment was performed at a temperature of 80° C. for 3 hours so as to produce a siloxane hard cured article.

EXAMPLE 7

Photopolymerization 2-(3,4-epoxycyclohexyl)ethyltrimethoxysilane (ECTMS, Gelest) and phenyltrimethoxysilane (PTMS, Gelest) were mixed at a ratio of 23.41 g:0.99 g (0.95 mol:0.05 mol), and 2.70 g (0.15 mol based on 0.1 mol of total silane) of water (H$_2$O, Sigma-Aldrich) was added thereto, and then the mixture was put into a 100 ml 2-neck flask. Thereafter, 0.05 ml of ammonia as a catalyst was added to the mixture, and stirred at 60° C. for 6 hours. The mixture was filtered using 0.45 μm Teflon filter, thereby obtaining an alicyclic epoxy siloxane hard resin. The molecular weight of the alicyclic epoxy siloxane hard resin was measured using a Matrix-Assisted Laser Desorption Ionization Mass Spectrometer. By using this measured value, it was confirmed that the alicyclic epoxy siloxane hard resin has a number average molecular weight of 1392, a weight average molecular weight of 1758, and PDI ($M_w/M_n$) of 1.26.

Next, 3-ethyl-3[[[3-ethyloxetan-3-yl]methoxy]methyl] oxetane as a photopolymerizable monomer was added in an amount of 20 parts by weight, based on the resultant resin, and an aryl sulfonium hexafluoroantimonate salt as a polymerization initiator for photopolymerization was added in an amount of 2 parts by weight, based on the mixed resin. Then, 1.35 parts by weight of iso-octyl-3-(3,5-di-tert-butyl-4-hydroxyphenyl)propionate and 3.6 parts by weight of tris (nonylphenyl) phosphite were added as antioxidants to prevent oxidation due to the polymerization, based on the resultant resin.

The siloxane hard resin composition was applied onto the surface of PET to have different thickness of 20, 40, and 60 μm, and then exposed to a UV lamp at 365 nm wavelength for 1 minute for photo-curing. After photo-curing was completely finished, thermal treatment was performed at a temperature of 80° C. for 1 hour so as to produce a siloxane hard cured article.

EXAMPLE 8

Thermal Polymerization 2-(3,4-epoxycyclohexyl)ethyltrimethoxysilane (ECTMS, Gelest) and phenyltrimethoxysilane (PTMS, Gelest) were mixed at a ratio of 23.41 g:0.99 g (0.95 mol:0.05 mol), and 2.70 g (0.15 mol based on 0.1 mol of total silane) of water (H$_2$O, Sigma-Aldrich) was added thereto, and then the mixture was put into a 100 ml 2-neck flask. Thereafter, 0.05 ml of ammonia as a catalyst was added to the mixture, and stirred at 60° C. for 6 hours. The mixture was filtered using 0.45 μm Teflon filter, thereby obtaining an alicyclic epoxy siloxane hard resin. The molecular weight of the alicyclic epoxy siloxane hard resin was measured using a Matrix-Assisted Laser Desorption Ionization Mass Spectrometer. By using this measured value, it was confirmed that the alicyclic epoxy siloxane hard resin has a number average molecular weight of 1392, a weight average molecular weight of 1758, and PDI ($M_w/M_n$) of 1.26.

Next, 4-methyl-1,2-cyclohexenedicarboxylic anhydride as a thermal polymerizable monomer was added in an amount of 90 parts by weight, based on the resultant resin, and 2-ethyl-4-methylimidazole as a polymerization initiator for thermal polymerization was added in an amount of 2 parts by weight, based on the mixed resin. Then, 1.35 parts by weight of iso-octyl-3-(3,5-di-tert-butyl-4-hydroxyphenyl)propionate and 3.6 parts by weight of tris(nonylphenyl) phosphite were added as antioxidants to prevent oxidation due to the polymerization, based on the resultant resin.

The siloxane hard resin composition was applied onto the surface of PET to have different thickness of 20, 40, and 60 μm, and then thermal treatment was performed at a temperature of 80° C. for 3 hours so as to produce a siloxane hard cured article.

EXAMPLE 9

Photopolymerization 2-(3,4-epoxycyclohexyl)ethyltrimethoxysilane (ECTMS, Gelest) and (heptadecafluoro-1,1,2,2-tetrahydrodecyl) trimethoxysilane (PFAS, Gelest) were mixed at a ratio of 24.15 g: 1.14 g (0.98 mol: 0.02 mol), and 2.70 g (0.15 mol based on 0.1 mol of total silane) of water (H$_2$O, Sigma-Aldrich) was added thereto, and then the mixture was put into a 100 ml 2-neck flask. Thereafter, 0.05 ml of ammonia as a catalyst was added to the mixture, and stirred at 60° C. for 6 hours. The mixture was filtered using 0.45 μm Teflon filter, thereby obtaining an alicyclic epoxy siloxane hard resin. The molecular weight of the alicyclic epoxy siloxane hard resin was measured using a Matrix-Assisted Laser Desorption Ionization Mass Spectrometer. By using this measured value, it was confirmed that the alicyclic epoxy siloxane hard resin has a number average molecular weight of 1979, a weight average molecular weight of 2507, and PDI ($M_w/M_n$) of 1.27.

Next, 3-ethyl-3 [[[3-ethyloxetan-3-yl]methoxy]methyl]oxetane as a photopolymerizable monomer was added in an amount of 20 parts by weight, based on the resultant resin, and an aryl sulfonium hexafluoroantimonate salt as a polymerization initiator for photopolymerization was added in an amount of 2 parts by weight, based on the mixed resin. Then, 1.35 parts by weight of iso-octyl-3-(3,5-di-tert-butyl-4-hydroxyphenyl)propionate and 3.6 parts by weight of tris(nonylphenyl) phosphite were added as antioxidants to prevent oxidation due to the polymerization, based on the resultant resin.

The siloxane hard resin composition was applied onto the surface of PET to have different thickness of 20, 40, and 60 μm, and then exposed to a UV lamp at 365 nm wavelength for 1 minute for photo-curing. After photo-curing was completely finished, thermal treatment was performed at a temperature of 80° C. for 1 hour so as to produce a siloxane hard cured article.

EXAMPLE 10

Thermal Polymerization 2-(3,4-epoxycyclohexyl)ethyltrimethoxysilane (ECTMS, Gelest) and (heptadecafluoro-1,1,2,2-tetrahydrodecyl)trimethoxysilane (PFAS, Gelest) were mixed at a ratio of 24.15 g: 1.14 g (0.98 mol: 0.02 mol), and 2.70 g (0.15 mol based on 0.1 mol of total silane) of water ($H_2O$, Sigma-Aldrich) was added thereto, and then the mixture was put into a 100 ml 2-neck flask. Thereafter, 0.05 ml of ammonia as a catalyst was added to the mixture, and stirred at 60° C. for 6 hours. The mixture was filtered using 0.45 μm Teflon filter, thereby obtaining an alicyclic epoxy siloxane hard resin. The molecular weight of the alicyclic epoxy siloxane hard resin was measured using a Matrix-Assisted Laser Desorption Ionization Mass Spectrometer. By using this measured value, it was confirmed that the alicyclic epoxy siloxane hard resin has a number average molecular weight of 1979, a weight average molecular weight of 2507, and PDI ($M_w/M_n$) of 1.27.

Next, 4-methyl-1,2-cyclohexenedicarboxylic anhydride as a thermal polymerizable monomer was added in an amount of 90 parts by weight, based on the resultant resin, and 2-ethyl-4-methylimidazole as a polymerization initiator for thermal polymerization was added in an amount of 2 parts by weight, based on the mixed resin. Then, 1.35 parts by weight of iso-octyl-3-(3,5-di-tert-butyl-4-hydroxyphenyl)propionate and 3.6 parts by weight of tris(nonylphenyl) phosphite were added as antioxidants to prevent oxidation due to the polymerization, based on the resultant resin.

The siloxane hard resin composition was applied onto the surface of PET to have different thickness of 20, 40, and 60 μm, and then thermal treatment was performed at a temperature of 80° C. for 3 hours so as to produce a siloxane hard cured article.

EXAMPLE 11

Photopolymerization 2-(3,4-epoxycyclohexyl)ethyltrimethoxysilane (ECTMS, Gelest) and 3-(meth)acryloxypropyltrimethoxysilane (MPTS, Gelest) were mixed at a ratio of 23.41 g:1.24 g (0.95 mol:0.05 mol), and 2.70 g (0.15 mol based on 0.1 mol of total silane) of water ($H_2O$, Sigma-Aldrich) was added thereto, and then the mixture was put into a 100 ml 2-neck flask. Thereafter, 0.05 ml of ammonia as a catalyst was added to the mixture, and stirred at 60° C. for 6 hours. The mixture was filtered using 0.45 μm Teflon filter, thereby obtaining an alicyclic epoxy siloxane hard resin. The molecular weight of the alicyclic epoxy siloxane hard resin was measured using a Matrix-Assisted Laser Desorption Ionization Mass Spectrometer. By using this measured value, it was confirmed that the alicyclic epoxy siloxane hard resin has a number average molecular weight of 1563, a weight average molecular weight of 2014, and PDI ($M_w/M_n$) of 1.29.

Next, 3-ethyl-3 [[[3-ethyloxetan-3-yl]methoxy]methyl]oxetane as a photopolymerizable monomer was added in an amount of 20 parts by weight, based on the resultant resin, and an aryl sulfonium hexafluoroantimonate salt as a polymerization initiator for photopolymerization was added in an amount of 2 parts by weight, based on the mixed resin. Then, 1.35 parts by weight of iso-octyl-3-(3,5-di-tert-butyl-4-hydroxyphenyl)propionate and 3.6 parts by weight of tris(nonylphenyl) phosphite were added as antioxidants to prevent oxidation due to the polymerization, based on the resultant resin.

The siloxane hard resin composition was applied onto the surface of PET to have different thickness of 20, 40, and 60 μm, and then exposed to a UV lamp at 365 nm wavelength for 1 minute for photo-curing. After photo-curing was completely finished, thermal treatment was performed at a temperature of 80° C. for 1 hour so as to produce a siloxane hard cured article.

EXAMPLE 12

Thermal Polymerization 2-(3,4-epoxycyclohexyl)ethyltrimethoxysilane (ECTMS, Gelest) and 3-(meth)acryloxypropyltrimethoxysilane (MPTS, Gelest) were mixed at a ratio of 23.41 g:1.24 g (0.95 mol:0.05 mol), and 2.70 g (0.15 mol based on 0.1 mol of total silane) of water ($H_2O$, Sigma-Aldrich) was added thereto, and then the mixture was put into a 100 ml 2-neck flask. Thereafter, 0.05 ml of ammonia as a catalyst was added to the mixture, and stirred at 60° C. for 6 hours. The mixture was filtered using 0.45 μm Teflon filter, thereby obtaining an alicyclic epoxy siloxane hard resin. The molecular weight of the alicyclic epoxy siloxane hard resin was measured using a Matrix-Assisted Laser Desorption Ionization Mass Spectrometer. By using this measured value, it was confirmed that the alicyclic epoxy siloxane hard resin has a number average molecular weight of 1563, a weight average molecular weight of 2014, and PDI ($M_w/M_n$) of 1.29.

Next, 4-methyl-1,2-cyclohexenedicarboxylic anhydride as a thermal polymerizable monomer was added in an amount of 90 parts by weight, based on the resultant resin, and 2-ethyl-4-methylimidazole as a polymerization initiator for thermal polymerization was added in an amount of 2 parts by weight, based on the mixed resin. Then, 1.35 parts by weight of iso-octyl-3-(3,5-di-tert-butyl-4-hydroxyphenyl)propionate and 3.6 parts by weight of tris(nonylphenyl) phosphite were added as antioxidants to prevent oxidation due to the polymerization, based on the resultant resin.

The siloxane hard resin composition was applied onto the surface of PET to have different thickness of 20, 40, and 60

μm, and then thermal treatment was performed at a temperature of 80° C. for 3 hours so as to produce a siloxane hard cured article.

The weight average molecular weights and PDI values of the alicyclic epoxy siloxane hard resins obtained in Examples are summarized in the following Table 1.

TABLE 1

| Example | Weight average molecular weight | PDI |
|---|---|---|
| 1, 2, 3 | 1771 | 1.18 |
| 4, 5, 6 | 2525 | 1.14 |
| 7, 8 | 1758 | 1.26 |
| 9, 10 | 2507 | 1.27 |
| 11, 12 | 2014 | 1.29 |

In order to measure the surface hardness of the siloxane hard cured articles obtained in Examples, a pencil hardness tester was used in accordance with ASTM D3363, and the results are shown in the following Table 2.

TABLE 2

| Example | Thickness of coating film on PET | | |
|---|---|---|---|
| | 20 μm | 40 μm | 60 μm |
| 1 | 8H | 9H | 9H |
| 2 | 8H | 8H | 9H |
| 3 | 3H | 4H | 4H |
| 4 | 8H | 9H | 9H |
| 5 | 8H | 8H | 9H |
| 6 | 3H | 4H | 4H |
| 7 | 8H | 8H | 9H |
| 8 | 3H | 4H | 4H |
| 9 | 7H | 8H | 9H |
| 10 | 3H | 3H | 4H |
| 11 | 7H | 8H | 9H |
| 12 | 3H | 3H | 4H |

As shown in Table 2, the siloxane hard resin of the present invention has a weight average molecular weight in the range of 1000 to 4000 and a molecular weight distribution of PDI 1.05 to 1.4 through polymerization reaction of the alicyclic epoxy group, thereby providing a siloxane hard cured article with high hardness by the compactly cross-linked siloxane molecules. Owing to easy processability, it also has the suitable properties as a hard coating agent.

Although the present invention has been described in connection with the exemplary embodiments, it will be apparent that the present invention is not limited to the above embodiments, various modifications may be made thereto, and those skilled in the art will envision other modifications within the scope and spirit of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A hard coating composition consisting essentially of an alicyclic epoxy group-containing siloxane resin, which has a weight average molecular weight in the range of 1000 to 4000 and a molecular weight distribution of PDI 1.05 to 1.4, and a reactive monomer which is an oxetane monomer capable of reacting with the alicyclic epoxy group to form crosslinking in an amount of 1 to 100 parts by weight, based on 100 parts by weight of the siloxane resin, wherein the siloxane resin is prepared, in the presence of water and a catalyst, by hydrolysis and condensation of (i) alkoxysilane containing an alicyclic epoxy group and an alkoxy group represented by the following Chemical Formula 1 alone, or (ii) alkoxysilane having an alicyclic epoxy group and an alkoxy group represented by the following Chemical Formula 1 and one or more selected from the group consisting of tetramethoxysilane, tetraethoxysilane, methyltrimethoxysilane, methyltriethoxysilane, methyltripropoxysilane, dimethyldimethoxysilane, dimethyldiethoxysilane, ethyltriethoxysilane, propyltrimethoxysilane, vinyltrimethoxysilane, vinyltriethoxysilane, vinyltripropoxysilane, N-(3-acryloxy-2-hydroxypropyl)-3-aminopropyltrimethoxysilane, N-(3-acryloxy-2-hydroxypropyl)-3-aminopropyltriethoxysilane, N-(3-acryloxy-2-hydroxypropyl)-3-aminopropyltripropoxysilane, 3-acryloxypropylmethylbis(trimethoxy)silane, 3-acryloxypropyltrimethoxysilane, 3-acryloxypropyltriethoxysilane, 3-acryloxypropyltripropoxysilane, 3-(meth)acryloxypropyltrimethoxysilane, 3-(meth)acryloxypropyltriethoxysilane, 3-(meth)acryloxypropyltripropoxysilane, N-(aminoethyl)-3-aminopropyltrimethoxysilane, N-(2-aminoethyl)-3-aminopropyltriethoxysilane, 3-aminopropyltrimethoxysilane, 3-aminopropyltriethoxysilane, chloropropyltrimethoxysilane, chloropropyltriethoxysilane, and heptadecafluorodecyltrimethoxysilane:

[Chemical Formula 1]

wherein $R^1$ is a straight or branched $C_1$ to $C_6$ alkyl group containing an alicyclic epoxy group, the alicyclic epoxy group is a $C_3$ to $C_6$ cycloalkyl group having an epoxy group, $R^2$ is a straight or branched $C_1$ to $C_7$ alkyl group, and n is an integer of 1 to 3.

2. The hard coating composition according to claim 1, wherein the alkoxysilane represented by Chemical Formula 1 is 2-(3,4-epoxycyclohexyl)ethyltrimethoxysilane, or 2-(3,4-epoxycyclohexyl)ethyltriethoxysilane.

3. The hard coating composition according to claim 1, wherein the oxetane monomer includes one or more of the oxetane group of the following Chemical Formula 4:

[Chemical Formula 4]

4. The hard coating composition according to claim 3, wherein the oxetane monomer is one or more selected from the group consisting of 3-ethyl-3-hydroxymethyloxetane, 2-ethylhexyloxetane, xylene bis oxetane, and 3-ethyl-3[[[3-ethyloxetan-3-yl]methoxy]methyl]oxetane.

5. The hard coating composition according to claim 1, wherein the catalyst is selected from the group consisting of basic catalysts, and ion exchange resins, including ammonia, potassium hydroxide, sodium hydroxide, barium hydroxide, imidazole, Amberite IRA-400, IRA-67, and combinations thereof.

6. A method for producing a hard cured article by polymerization of the hard coating composition according to claim 1.

7. The method according to claim 6, wherein the polymerization includes a step of radiation or heating.

8. An optical film or sheet comprising the hard cured article that is produced by polymerization of the hard coating composition according to claim 1.

9. A hard coating composition consisting essentially of an alicyclic epoxy group-containing siloxane resin, which has a weight average molecular weight in the range of 1000 to 4000 and a molecular weight distribution of PDI 1.05 to 1.4, and
an organic solvent in an amount of 0.1 to 10 parts by weight, based on 100 parts by weight of the siloxane resin,
wherein the siloxane resin is prepared, in the presence of water and a catalyst, by hydrolysis and condensation of (i) alkoxysilane containing an alicyclic epoxy group and an alkoxy group represented by the following Chemical Formula 1 alone, or (ii) alkoxysilane having an alicyclic epoxy group and an alkoxy group represented by the following Chemical Formula 1 and one or more selected from the group consisting of tetramethoxysilane, tetraethoxysilane, methyltrimethoxysilane, methyltriethoxysilane, methyltripropoxysilane, dimethyldimethoxysilane, dimethyldiethoxysilane, ethyltriethoxysilane, propyltrimethoxysilane, vinyltrimethoxysilane, vinyltriethoxysilane, vinyltripropoxysilane, N-(3-acryloxy-2-hydroxypropyl)-3-aminopropyltrimethoxysilane, N-(3-acryloxy-2-hydroxypropyl)-3-aminopropyltriethoxysilane, N-(3-acryloxy-2-hydroxypropyl)-3-aminopropyltripropoxysilane, 3-acryloxypropylmethylbis(trimethoxy)silane, 3-acryloxypropyltrimethoxysilane, 3-acryloxypropyltriethoxysilane, 3-acryloxypropyltripropoxysilane, 3-(meth)acryloxypropyltrimethoxysilane, 3-(meth)acryloxypropyltriethoxysilane, 3-(meth)acryloxypropyltripropoxysilane, N-(aminoethyl)-3-aminopropyltrimethoxysilane, N-(2-aminoethyl)-3-aminopropyltriethoxysilane, 3-aminopropyltrimethoxysilane, 3-aminopropyltriethoxysilane, chloropropyltrimethoxysilane, chloropropyltriethoxysilane, and heptadecafluorodecyltrimethoxysilane:

[Chemical Formula 1]

wherein $R^1$ is a straight or branched $C_1$ to $C_6$ alkyl group containing an alicyclic epoxy group, the alicyclic epoxy group is a C3 to C6 cycloalkyl group having an epoxy group, $R^2$ is a straight or branched C1 to C7 alkyl group, and n is an integer of 1 to 3.

10. A hard coating composition consisting essentially of an alicyclic epoxy group-containing siloxane resin, which has a weight average molecular weight in the range of 1000 to 4000 and a molecular weight distribution of PDI 1.05 to 1.4;
an oxetane monomer capable of reacting with the alicyclic epoxy group to form crosslinking in an amount of 1 to 100 parts by weight, based on 100 parts by weight of the siloxane resin; and
a polymerization initiator selected from the group consisting of onium salts, organometallic salts, amines, and imidazoles in an amount of 0.1 to 10 parts by weight, based on 100 parts by weight of the siloxane resin,
wherein the siloxane resin is prepared, in the presence of water and a catalyst, by hydrolysis and condensation of (i) alkoxysilane containing an alicyclic epoxy group and an alkoxy group represented by the following Chemical Formula 1 alone, or (ii) alkoxysilane having an alicyclic epoxy group and an alkoxy group represented by the following Chemical Formula 1 and one or more selected from the group consisting of tetramethoxysilane, tetraethoxysilane, methyltrimethoxysilane, methyltriethoxysilane, methyltripropoxysilane, dimethyldimethoxysilane, dimethyldiethoxysilane, ethyltriethoxysilane, propyltrimethoxysilane, vinyltrimethoxysilane, vinyltriethoxysilane, vinyltripropoxysilane, N-(3-acryloxy-2-hydroxypropyl)-3-aminopropyltrimethoxysilane, N-(3-acryloxy-2-hydroxypropyl)-3-aminopropyltriethoxysilane, N-(3-acryloxy-2-hydroxypropyl)-3-aminopropyltripropoxysilane, 3-acryloxypropylmethylbis(trimethoxy)silane, 3-acryloxypropyltrimethoxysilane, 3-acryloxypropyltriethoxysilane, 3-acryloxypropyltripropoxysilane, 3-(meth)acryloxypropyltrimethoxysilane, 3-(meth)acryloxypropyltriethoxysilane, 3-(meth)acryloxypropyltripropoxysilane, N-(aminoethyl)-3-aminopropyltrimethoxysilane, N-(2-aminoethyl)-3-aminopropyltriethoxysilane, 3-aminopropyltrimethoxysilane, 3-aminopropyltriethoxysilane, chloropropyltrimethoxysilane, chloropropyltriethoxysilane, and heptadecafluorodecyltrimethoxysilane:

[Chemical Formula 1]

wherein $R^1$ is a straight or branched $C_1$ to $C_6$ alkyl group containing an alicyclic epoxy group, the alicyclic epoxy group is a C3 to C6 cycloalkyl group having an epoxy group, $R^2$ is a straight or branched C1 to C7 alkyl group, and n is an integer of 1 to 3.

11. A hard coating composition consisting essentially of an alicyclic epoxy group-containing siloxane resin, which has a weight average molecular weight in the range of 1000 to 4000 and a molecular weight distribution of PDI 1.05 to 1.4;
an oxetane monomer capable of reacting with the alicyclic epoxy group to form crosslinking in an amount of 1 to 100 parts by weight, based on 100 parts by weight of the siloxane resin; and
one or more additives selected from the group consisting of an organic solvent, an antioxidant, a leveling agent, and a coating control agent,
wherein the siloxane resin is prepared, in the presence of water and a catalyst, by hydrolysis and condensation of (i) alkoxysilane containing an alicyclic epoxy group and an alkoxy group represented by the following Chemical Formula 1 alone, or (ii) alkoxysilane having an alicyclic epoxy group and an alkoxy group represented by the following Chemical Formula 1 and one or more selected from the group consisting of tetramethoxysilane, tetraethoxysilane, methyltrimethoxysilane, methyltriethoxysilane, methyltripropoxysilane, dimethyldimethoxysilane, dimethyldiethoxysilane, ethyltriethoxysilane, propyltrimethoxysilane, vinyltrimethoxysilane, vinyltriethoxysilane, vinyltripropoxysilane, N-(3-acryloxy-2-hydroxypropyl)-3-aminopropyltrimethoxysilane, N-(3-acryloxy-2-hydroxypropyl)-3-aminopropyltriethoxysilane, N-(3-acryloxy-2-hydroxypropyl)-3-aminopropyltripropoxysilane, 3-acryloxypropylmethylbis(trimethoxy)silane, 3-acryloxypropyltrimethoxysilane, 3-acryloxypropyltriethoxysilane, 3-acryloxypropyltripropoxysilane, 3-(meth)acryloxypropyltrimethoxysilane, 3-(meth)acryloxypropyltriethoxysilane, 3-(meth)acryloxypropyltripropoxysilane, N-(aminoethyl)-3-aminopropyltrimethoxysilane, N-(2-aminoethyl)-3- aminopropyltriethoxysilane, 3-aminopropyltrimethoxysilane, 3-aminopropyltriethoxysilane, chloropropyltrimethoxysilane, chloropropyltriethoxysilane, and heptadecafluorodecyltrimethoxysilane:

$$R^1{}_n Si(OR^2)_{4-n} \quad \text{[Chemical Formula 1]}$$

wherein $R^1$ is a straight or branched $C_1$ to $C_6$ alkyl group containing an alicyclic epoxy group, the alicyclic epoxy group is a C3 to C6 cycloalkyl group having an epoxy group, R2 is a straight or branched C1 to C7 alkyl group, and n is an integer of 1 to 3.

* * * * *